United States Patent
Kovar et al.

(10) Patent No.: US 6,241,265 B1
(45) Date of Patent: Jun. 5, 2001

(54) RECREATIONAL VEHICLE FOR SNOW COVERED HILLS

(75) Inventors: Christopher D. Kovar, Ellicott City; Neal Tyson Spangler, Baltimore; Ramon J. Kipnes, Monkton, all of MD (US)

(73) Assignee: Rapid Descent Systems, Inc., Ellicott City, MD (US)

( * ) Notice: Subject to any disclaimer, the term of this patent is extended or adjusted under 35 U.S.C. 154(b) by 0 days.

(21) Appl. No.: 09/455,817

(22) Filed: Dec. 4, 1999

(51) Int. Cl.[7] ............................. B62B 13/08; B62B 9/08
(52) U.S. Cl. ................. 280/16; 280/12.14; 280/28.11; 280/25; 180/182
(58) Field of Search ................. 280/16, 12.14, 280/28.11, 25, 22, 21.1, 845; 180/182

(56) References Cited

U.S. PATENT DOCUMENTS

| | | |
|---|---|---|
| 944,848 | 12/1909 | Doughty . |
| 1,429,636 | 9/1922 | Rowe . |
| 1,658,490 * | 1/1928 | Lorusso . |
| 2,442,404 | 7/1948 | Foner . |
| 2,479,674 | 8/1949 | Elliott . |
| 3,140,099 | 7/1964 | Feu . |
| 3,178,196 | 4/1965 | Colace . |
| 3,361,436 | 1/1968 | Williams . |
| 3,561,783 | 2/1971 | Ellett . |
| 3,682,495 | 8/1972 | Zaimi . |
| 3,698,497 * | 10/1972 | Bombardier .................. 180/5 R |
| 3,870,330 * | 3/1975 | Hatano et al. .................. 280/16 |
| 4,768,794 * | 9/1988 | Bibollet .................. 280/21 R |
| 4,796,902 | 1/1989 | Capra . |
| 5,397,154 * | 3/1995 | Baldwin .................. 280/818 |
| 5,580,071 | 12/1996 | Yu . |
| 5,673,772 * | 10/1997 | Martin .................. 188/6 |

* cited by examiner

Primary Examiner—Brian L. Johnson
Assistant Examiner—Tony Winner
(74) Attorney, Agent, or Firm—William S. Ramsey

(57) ABSTRACT

The recreational vehicle disclosed here is a ski bike with four skis which is steerable using a handle bar. Both the front and rear skis have suspension systems which have shock absorbers. Brakes on each from ski serve to slow the bike and to assist in steering the bike, and a rear brake is used to slow and stop the bike.

1 Claim, 5 Drawing Sheets

RECREATIONAL VEHICLE FOR SNOW COVERED HILLS

BACKGROUND OF THE INVENTION

1. Field of the Invention

This invention relates to snow vehicles or coasting devices of the type primarily used for gliding over hills covered with snow or ice.

2. Description of Related Art

U.S. Pat. No. 944,848 discloses a sled with two skis mounted to the front of a riding board, two more skis mounted to the rear of said riding board, and a steering bar that goes through the front of the riding board and controls the direction of the sled by changing the direction in which the front skis point.

U.S. Pat. No. 1,429,636 discloses a snow vehicle consisting of a frame, four skis, a seat and a steering bar.

U.S. Pat. No. 2,479,674 discloses a snow vehicle consisting of a frame, two skis, a seat and a steering bar.

U.S. Pat. No. 2,442,404 discloses a snow vehicle consisting of a frame, four skis, a seat, a steering bar and a front brake.

U.S. Pat. No. 3,140,099 discloses a ski-type bobsled comprising either one or two interconnected pairs of skis connected by a chassis which provides a means to steer the sled by shifting the driver's body weight from side to side.

U.S. Pat. No. 3,178,196 discloses a ski bike consisting of a frame, handle-bars, two skis mounted one in front and one in back and a seat. U.S. Pat. No. 3,361,436 discloses a two-seat ski sled having a pair of transverse mounted frames, four skis, two in the front and two in the back, and a braking lever which slows the sled by moving the front skis toward each other at their fronts.

U.S. Pat. No. 3,561,783 discloses a collapsible snow vehicle consisting of a frame, a seat, handlebars for steering a single front ski, and a rear ski spring-mounted to the frame.

U.S. Pat. No. 3,682,495 discloses a snow vehicle consisting of a frame, a seat, two front skis with hand-controlled braking, and a rear ski.

U.S. Pat. No. 4,796,902 discloses a steerable snow sled consisting of a chassis to which is connected two rear skis, two front skis which are steered by means of a steering bar hooked to a multi-hinged steering mechanism.

U.S. Pat. No. 5,580,071 discloses a snow vehicle consisting of a seat to which is mounted two rear skis, a steering bar and a front ski which is steered by means of the bar and the riders's feet, which are placed in stirrups over the front ski.

SUMMARY OF THE INVENTION

The primary object of the invention is to provide a vehicle of this character, including skis supported on a fully suspended frame, the frame being constructed so that the forward runners may be adjusted or rotated to guide the vehicle.

Another object of the invention is to provide a snow vehicle having a seat to accommodate riders of various sizes in a manner that allows said riders to position their centers of gravity for maximum speed and control.

Another object of the invention is to provide a snow vehicle having skis, the front ends of which will tilt up to accommodate various terrains but which will only tilt down in front to a position parallel with the rider's seat.

Another object of the invention is to provide a brake means whereby the forward movement of the snow vehicle will be slowed at the will of the rider.

Another object of the invention is to provide independent suspension to each of the skis to create a more comfortable ride and to give the rider more control over the vehicle.

With the foregoing and other objects in view which win appear as the description proceeds, reference is made to the appended drawings and the following description thereof which will illustrate a form of the invention by way of example and not of limitation, it being understood that changes may be made in the construction and arrangement of parts without departing from the spirit of the invention claimed.

DETAILED DESCRIPTION

Figure 1:
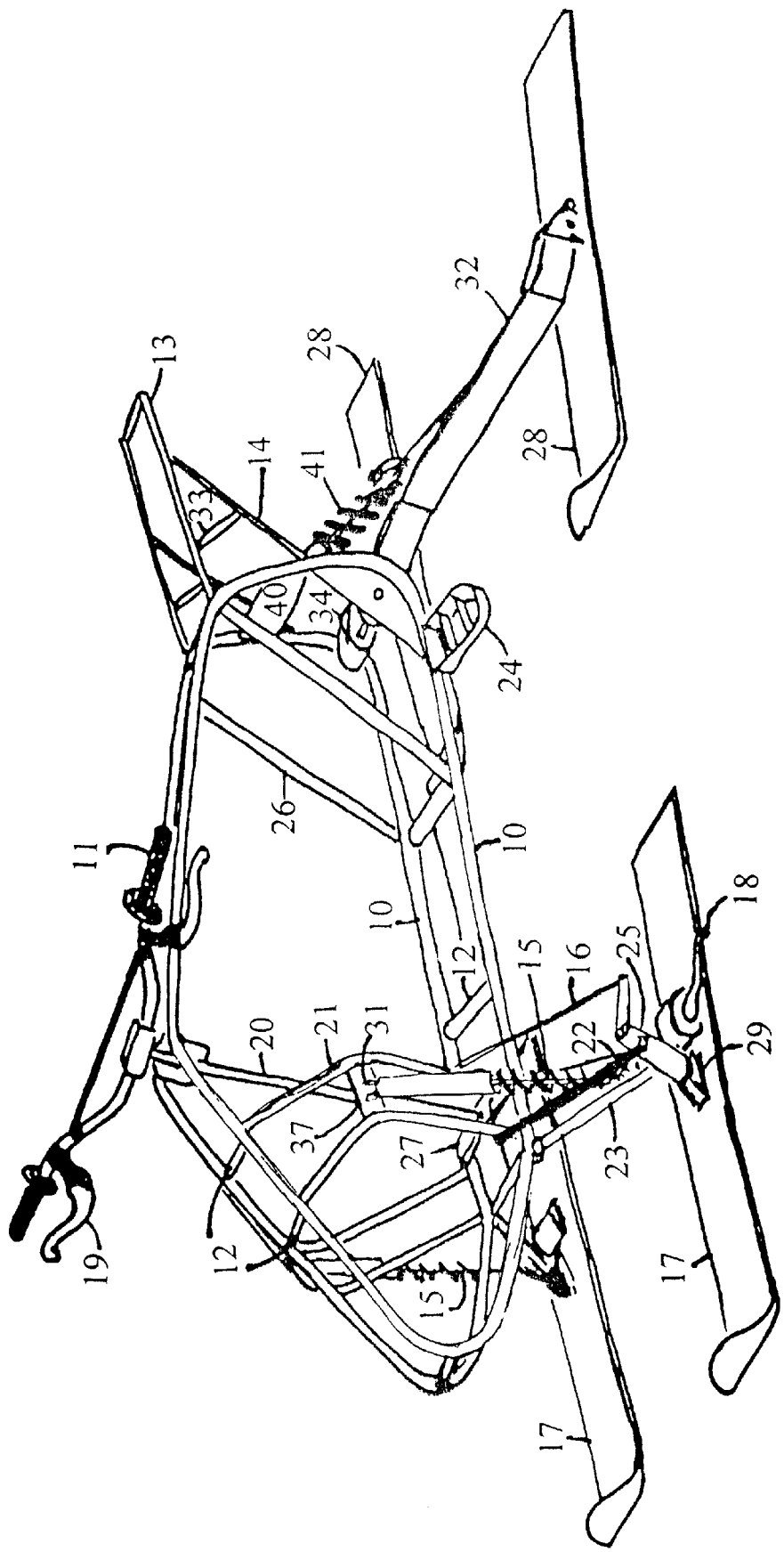
FIG. 1 is a side elevation view of a snow vehicle constructed in accordance with the invention.

FIG. 1 shows the snow vehicle comprised of a frame 10 of two identical pieces of metal tubing bent arcuately at the front and back portions, the front arc being larger than the back arc, the two structures being connected together side by side by metal ribs 12 at various places along each half of the frame 10. For added support, metal bars 26 are placed near the rear of the bike between the top and bottom of the frame.

Connected to the back end of the frame 10 where the downward arc begins is a U-shaped extension 13 that is mounted to the frame 10 so as to be parallel to the ground. Running from nearly the back of the extension 13 to the lower portion of the downward arc of the frame 10 is a support bar 14 which is used to provide extra support to the extension 13. Between the extension 13 and the support bar 14 is another support bar 33, also used to increase the support strength of the extension 13. The purpose of the extension is to help hold the molded frame cover that serves both to cover the frame and to provide a seat for the rider.

Figure 2:
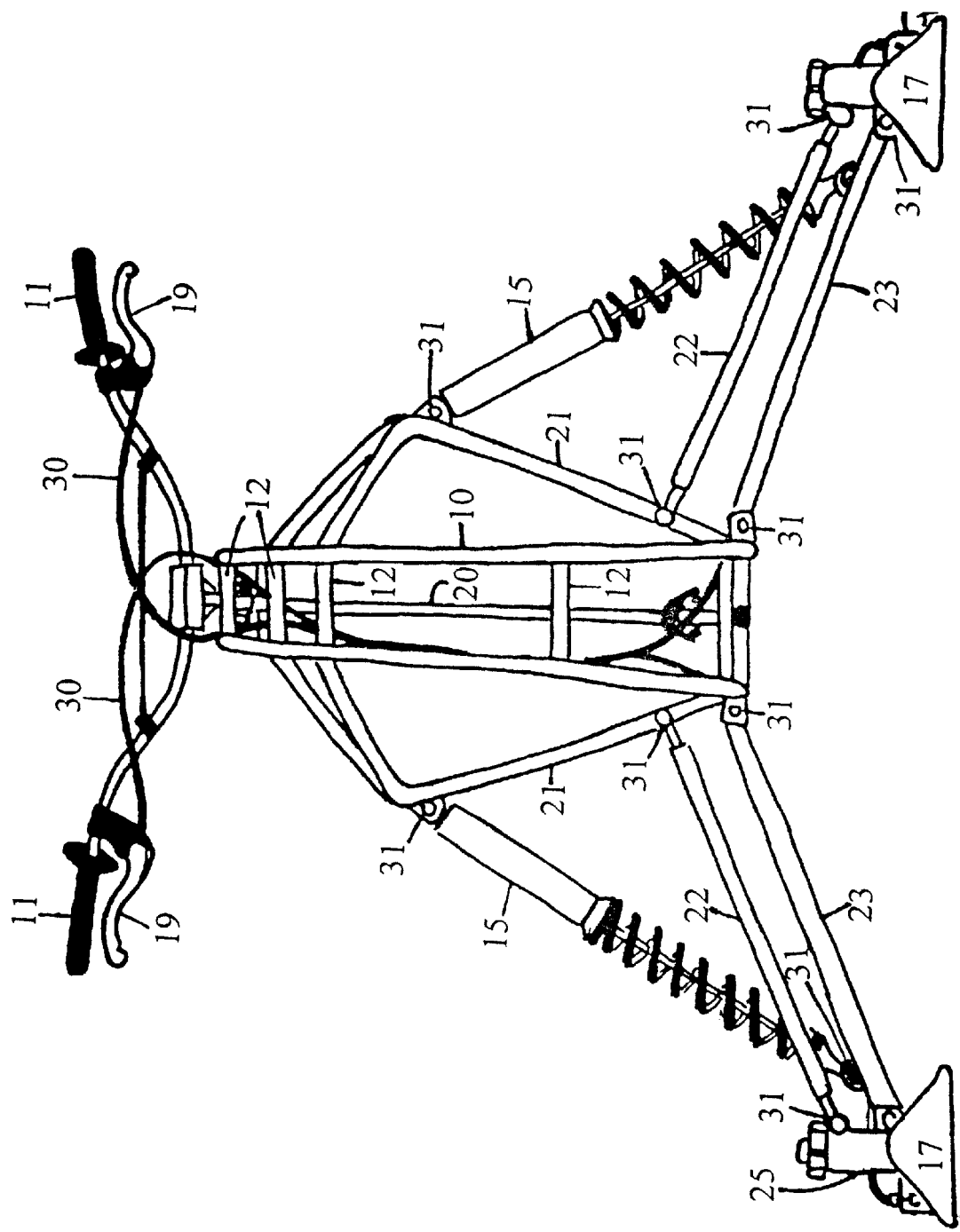
FIG. 2 is a front elevation view thereof

FIG. 2 shows the beginning of the front arc of the frame 10 from the top of the snow vehicle is connected a steering column 20 which is fastened to the frame 10 perpendicular to the ground. The bottom runs through a metal strip 27 attached to the bottom of the frame 10. To the bottom of the steering column 20 are connected tie rods 22 which are attached to the tops of swivel joints 25 which are connected to the front skis. Connected to the bottom of the swivel joints 25 and the bottom of the frame 10 are metal bars 23 which hold the skis to the vehicle. Connected to the tops of the swivel joints 25 and the frame 10 are telescoping connectors which help hold the skis in place while allowing some flexible movement of the skis 17 as they go over rough terrain. The clamps 31 connect the telescoping connectors 22 and the metal bars 23 to the front skis via pins which allow the metal bars 23 and the tie rods 22 vertical play when crossing rugged terrain. That play is limited by shock absorbers 15.

The shock absorbers 15 are used to smooth out the ride of the vehicle while assuring that the front skis 17 maintain contact with the ground. They are connected via pins, on one end to the bars 23 running between the front skis 17 and the frame 10. At their opposite ends the shock absorbers 15 are connected via clamps to a strip of metal 37 connected to twin supports 21 constructed of metal tubing arcuately bent and connected side-by-side to the frame 10 and bowing out to the sides of the vehicle. These supports 21 give extra strength to the frame 10 where the front steering skis 17 and associated steering linkages are connected to the vehicle.

At the bottom of the swivel joints 25 are attached clamps 29 which hold the front skis 17. These clamps 29 allow the skis 17 to move up in the front to accommodate various terrains but prevent the skis 17 from moving down in the front to a position lower than parallel to the bottom of the frame 10.

The top of the steering column 20 is connected to handle bars 11 which the rider uses to control the front skis 17 and thereby steer the vehicle. When the rider turns the handle bars 11, the steering column 20, which rests on a base 27 which spans the bottom of the frame 10, pushes the tie rods 16 which cause the skis 17 to be turned in the direction the rider wishes to travel.

Connected to the handle bars 11 are hand brakes 19. The hand brakes 19 connect to cables 30 which run down the steering column and then to each of the skis where they connect to spring-mounted metal brakes 18 attached to the tops of each of the front skis 17. The hand brake on the right side of the handle bars controls the brake on the right front ski, while the hand brake on the left handle bar controls the brake on the left front ski. When the rider pulls a hand brake 19 the cable 30 causes the metal brake 18 to be lowered into the snow, causing a drag on that ski, thus slowing it down and thereby forcing the vehicle to turn in the direction of the brake that has been activated.

Figure 3:
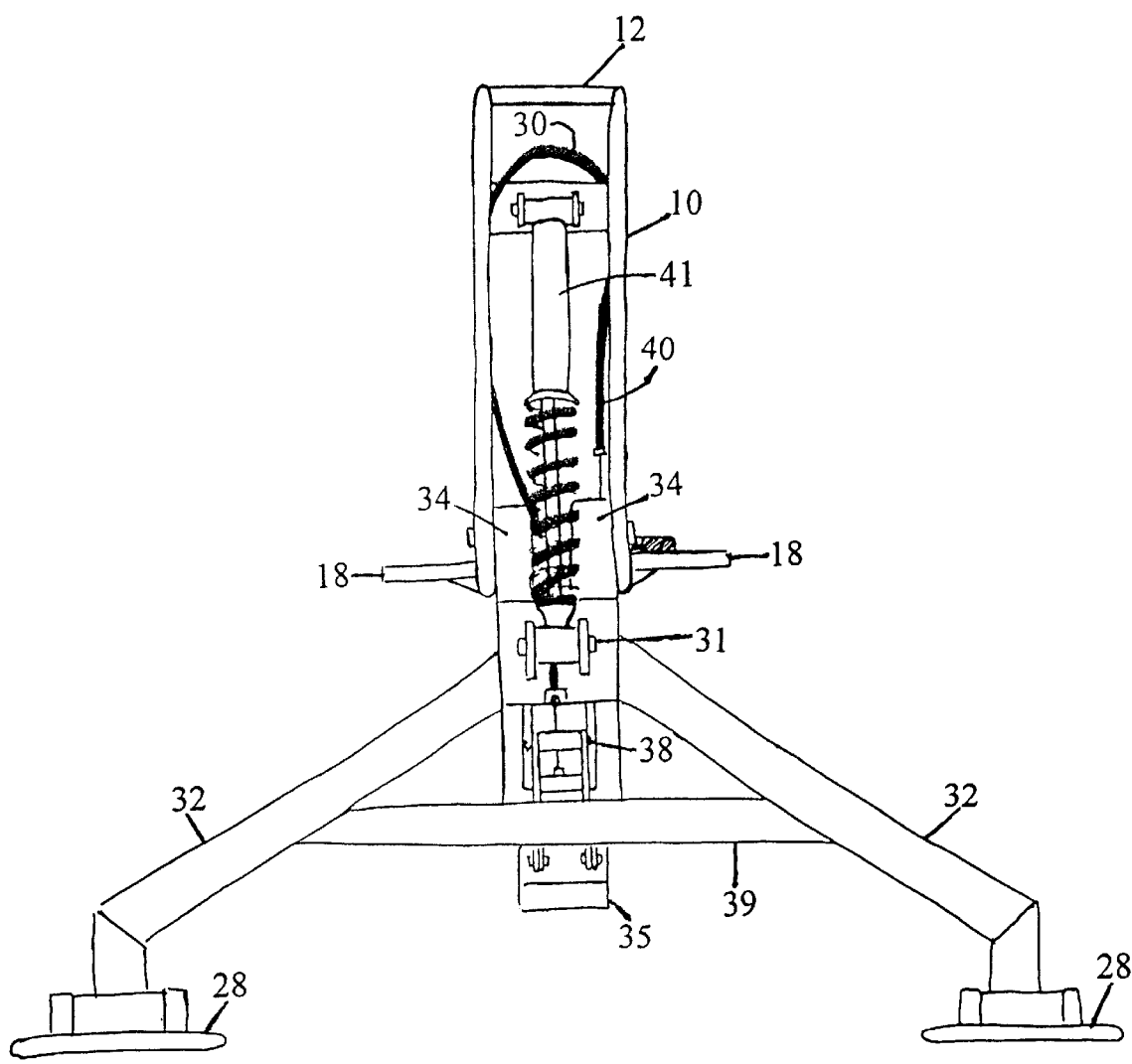
FIG. 3 is a rear elevation view thereof

FIG. 3 he rear skis 28 of the vehicle are attached to a V-shaped clamp 32. The point of the V is attached to two metal bars 34 which are attached via pins 18 to the frame 10. Connected to the two arms of the V-shaped clamp 32 is a bar 39 which holds the two legs together. The point of the V is also attached via a clamp 31 to a shock absorber 41 which is attached at its other end to a metal bar 40 attached to the rear arc of the two halves of the frame 10. This shock absorber 41 gives the rider more comfort by cushioning blows to the rear skis 28.

A foot pedal 24 is spring mounted to the bottom of the frame 10 near the beginning of the rear arc. This pedal is connected to a cable 30 which connect to a joint 38 which is spring mounted to a metal brake foot 35. When the rider depresses the pedal 24, the cable causes the metal brake foot 35 to be lowered into the snow, causing a drag on the vehicle and thus slowing it down or stopping it.

Figure 4:
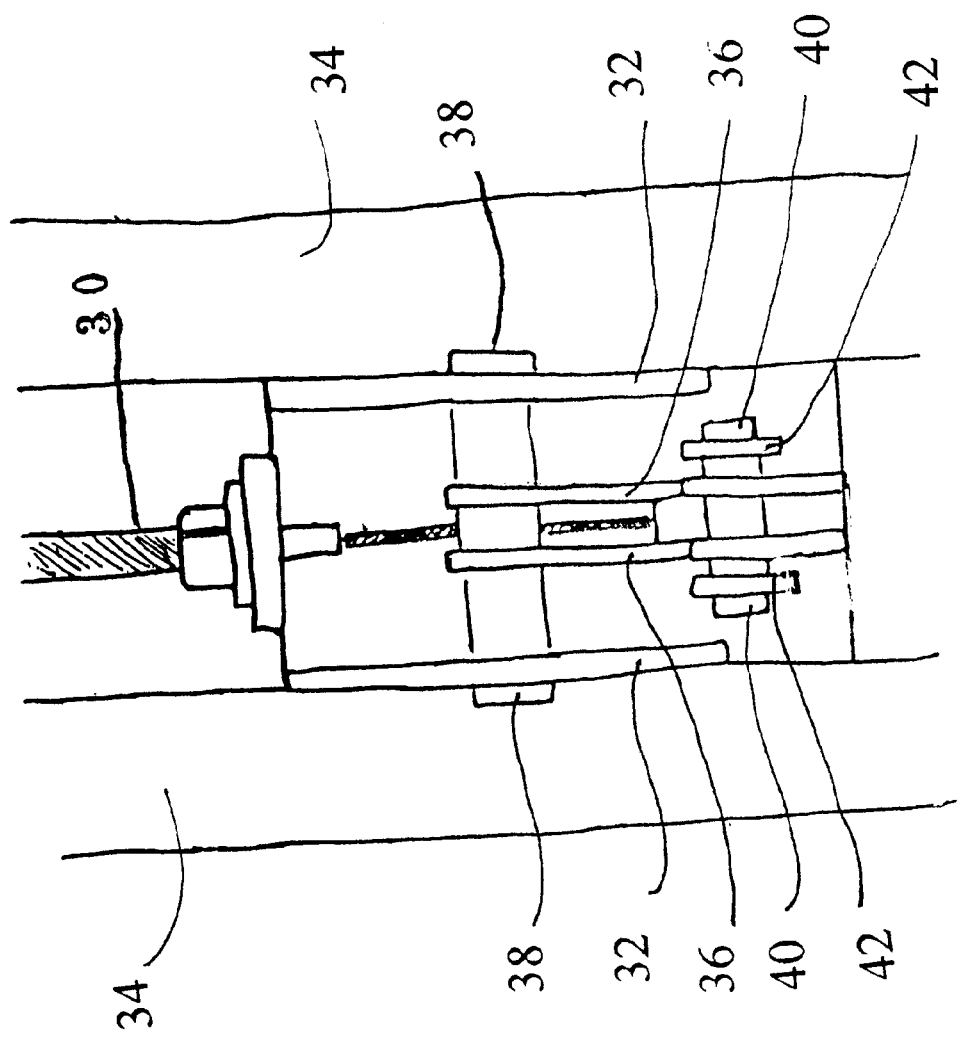
FIG. 4 is a rear elevation view showing the rear brake linkage.
Figure 5:
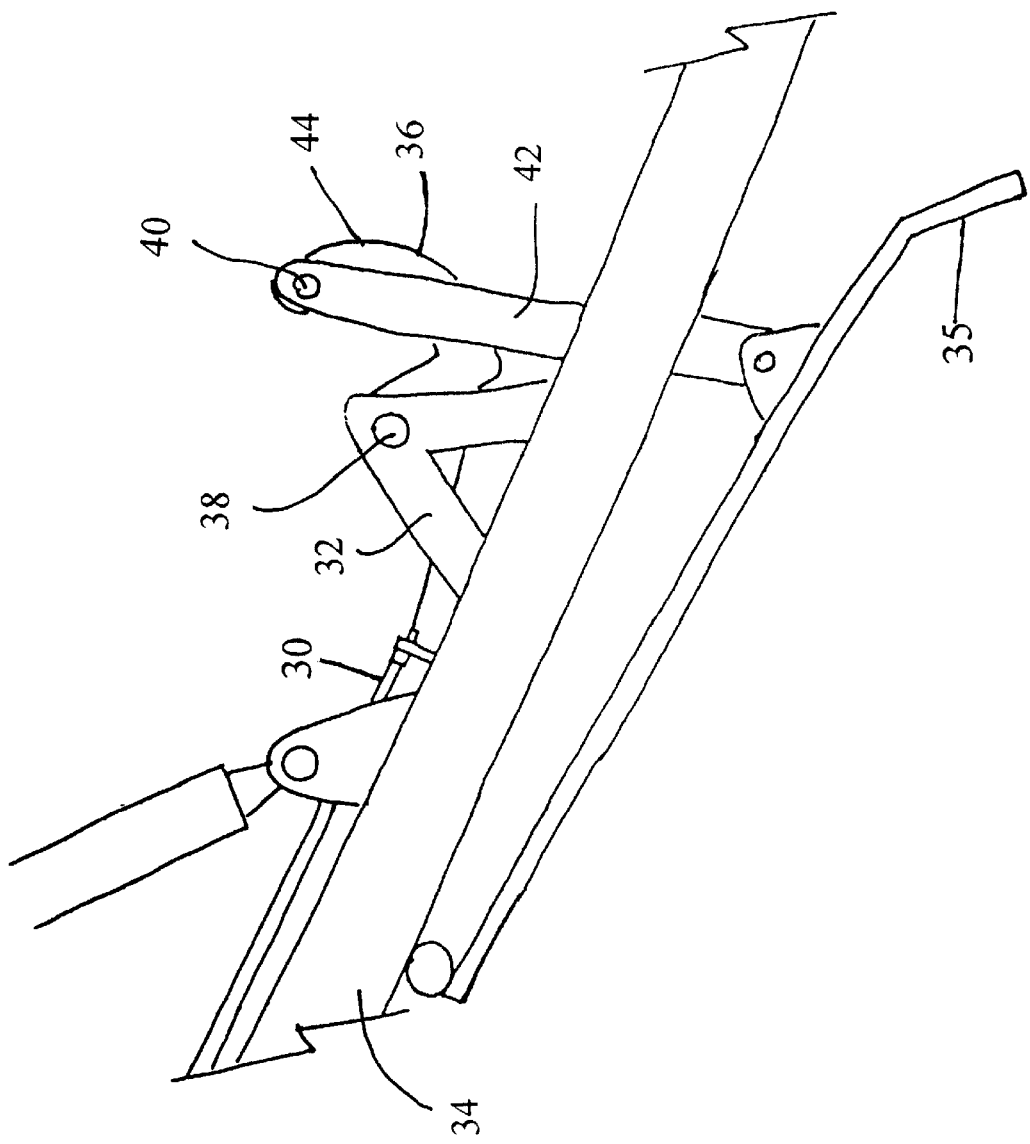
FIG. 5 is a side elevation view showing the rear brake mechanism.

FIG. 4 is a rear view and FIG. 5 is a side view of the rear brake linkage 44. The brake cable 30 connects the pedal 24 and the linkage 38. Two inverted V supports 32 are mounted on the metal arms 34. A pivot pin 38 spans a hole in the top of each of the supports 32 and also connects two C-shaped arms 36. The C-shaped arms 36 are also connected to each other by bar 37 to which the cable 30 is connected. The C-shaped arms 36 are also connected to two force arms 42 by pivot pin 40. The force arms 42 are pivotally connected to the brake foot 35. The other end of the brake foot 35 is pivotally connected to the metal arms 34.

In operation, depression of the pedal 24 causes retraction of cable 30, forward movement of the C-shaped arms 36, downward movement of the force arms 42, and downward movement of the brake foot 35, thereby slowing the motion of the ski bike.

The entire frame 10 is covered with a sturdy plastic body which is used to both enhance the appearance of the vehicle as well as providing a seat for the rider.

We claim:

1. A ski bike comprising: a frame, a steering post having handle bars at the top, two rear skis attached to the frame parallel to the bottom of said frame, two front skis controlled by the steering post, and hinged to permit a lifting action at the front of the front skis, front and rear ski brakes, said rear ski brake mounted between said rear skis, a pedal which forces a brake foot into contact with the surface over which said bike is moving, the pedal connected to a cable, said cable connected to a C-shaped arm, said C-shaped arm pivotally connected to a force arm, said force arm pivotally connected to the brake foot, said brake foot pivotally connected to metal arms so that depression of the pedal causes forward movement of the C-shaped arm, downward movement of the force arm, and downward movement of the brake foot.

* * * * *